United States Patent
Reardon

(10) Patent No.: US 7,377,859 B2
(45) Date of Patent: May 27, 2008

(54) DECORATIVE GRIP AND METHOD FOR MAKING

(75) Inventor: Andrew F. Reardon, Westerville, OH (US)

(73) Assignee: Underscore Golf LLC, Westerville, OH (US)

( * ) Notice: Subject to any disclaimer, the term of this patent is extended or adjusted under 35 U.S.C. 154(b) by 0 days.

(21) Appl. No.: 10/839,580

(22) Filed: May 5, 2004

(65) Prior Publication Data

US 2004/0224786 A1 Nov. 11, 2004

Related U.S. Application Data

(60) Provisional application No. 60/538,924, filed on Jan. 23, 2004, provisional application No. 60/467,834, filed on May 5, 2003.

(51) Int. Cl.
*A63B 53/14* (2006.01)

(52) U.S. Cl. ..................................... 473/300

(58) Field of Classification Search ........ 473/300–303; 74/551.9; 81/489; 16/DIG. 18, DIG. 19, 16/DIG. 12, 421, 430
See application file for complete search history.

(56) References Cited

U.S. PATENT DOCUMENTS

| | | | | |
|---|---|---|---|---|
| 3,374,911 A | * | 3/1968 | White | 215/366 |
| 4,133,529 A | | 1/1979 | Gambino | |
| 4,263,734 A | * | 4/1981 | Bradshaw | 40/324 |
| 4,867,453 A | | 9/1989 | Winters | |
| 4,953,861 A | | 9/1990 | Nakanishi | |
| 5,154,956 A | * | 10/1992 | Fradrich | 428/40.6 |
| 5,197,732 A | | 3/1993 | Lanctot | |
| 5,239,158 A | | 8/1993 | Locklear et al. | |
| 5,244,209 A | | 9/1993 | Benzel | |
| 5,324,614 A | * | 6/1994 | Bluett | 430/124 |
| 5,373,138 A | | 12/1994 | Locklear et al. | |
| 5,398,930 A | | 3/1995 | Gibson | |
| 5,491,010 A | * | 2/1996 | Eder | 428/35.7 |
| 5,524,885 A | | 6/1996 | Heo | |
| 5,525,383 A | * | 6/1996 | Witkowski | 428/30 |
| 5,543,191 A | * | 8/1996 | Dronzek et al. | 428/41.5 |
| 5,575,721 A | | 11/1996 | Lilly | |
| 5,653,643 A | | 8/1997 | Falone et al. | |
| 5,686,158 A | * | 11/1997 | Gibbon | 428/36.92 |
| 5,711,720 A | * | 1/1998 | Janes et al. | 473/300 |
| 5,730,669 A | | 3/1998 | Huang | |
| 5,749,792 A | * | 5/1998 | Engfer et al. | 473/300 |

(Continued)

FOREIGN PATENT DOCUMENTS

WO WO 97/20697 * 6/1997

OTHER PUBLICATIONS

Golfsmith Clubmaker Direct catalog, pp. 39-43 (Apr. 2004).

(Continued)

*Primary Examiner*—Stephen Blau
(74) *Attorney, Agent, or Firm*—Thompson Hine LLP

(57) ABSTRACT

A decorative grip system including a decorative grip having a label with decorative indicia located thereon, the label being formed in a generally closed shape. The decorative grip system further includes an underlay layer located generally inside of the label and a generally translucent overlay layer located generally outside of the label and having a thickness of less than about 5/32 inch.

12 Claims, 11 Drawing Sheets

U.S. PATENT DOCUMENTS

| | | |
|---|---|---|
| 5,857,241 A | 1/1999 | Camp, Jr. et al. |
| 5,862,571 A | 1/1999 | Naft et al. |
| 6,024,903 A | 2/2000 | Naft et al. |
| 6,036,610 A | 3/2000 | Lewark |
| 6,473,939 B1 | 11/2002 | Stegmaier |
| 6,516,548 B2 * | 2/2003 | Lage et al. .................. 40/324 |
| 6,544,634 B1 * | 4/2003 | Abrams et al. ............. 428/212 |
| 6,558,270 B2 | 5/2003 | Kwitek |
| 6,656,054 B2 | 12/2003 | Ulrich |
| 6,656,057 B2 | 12/2003 | Manual et al. |
| 6,696,659 B1 | 2/2004 | Wallace et al. |
| 6,854,163 B1 * | 2/2005 | Ruana ........................ 16/431 |
| 6,858,286 B1 | 2/2005 | Simm et al. |
| 6,889,405 B2 | 5/2005 | Ritrovato et al. |
| 7,025,690 B2 | 4/2006 | Nam |
| 2003/0068453 A1 * | 4/2003 | Kong ........................ 428/35.2 |
| 2003/0173717 A1 * | 9/2003 | Abrams et al. ............. 264/496 |
| 2003/0176234 A1 * | 9/2003 | Sheets et al. ............... 473/300 |
| 2003/0211900 A1 * | 11/2003 | Novak et al. ............... 473/300 |
| 2003/0222100 A1 * | 12/2003 | Husband et al. ............ 222/105 |

OTHER PUBLICATIONS

The Golf Works—2004 Clubmaker's Catalog, pp. 139-167.
Web page by Eaton Golf Pride personalized grips (Jan. 19, 2004).
Web page by Eaton Golf Pride customized grips (Jan. 19, 2004).

* cited by examiner

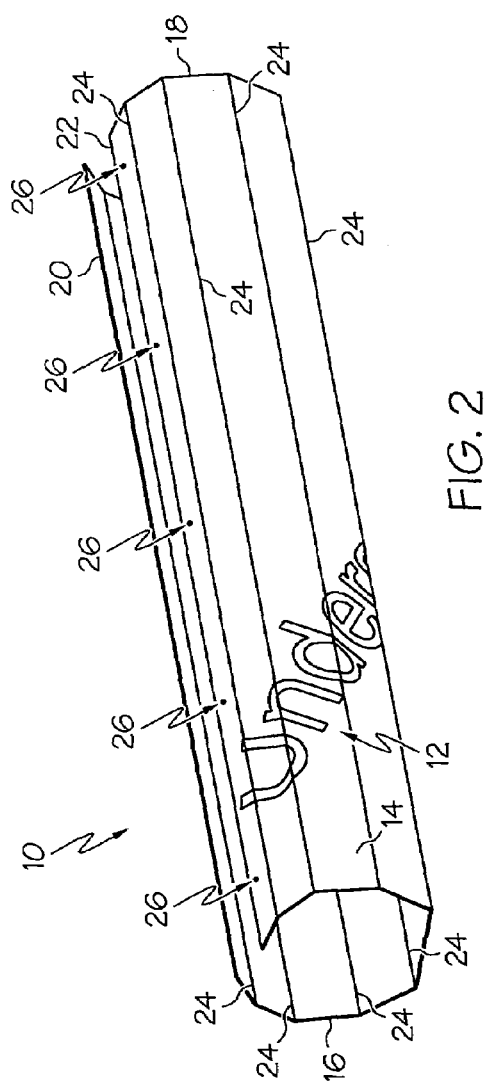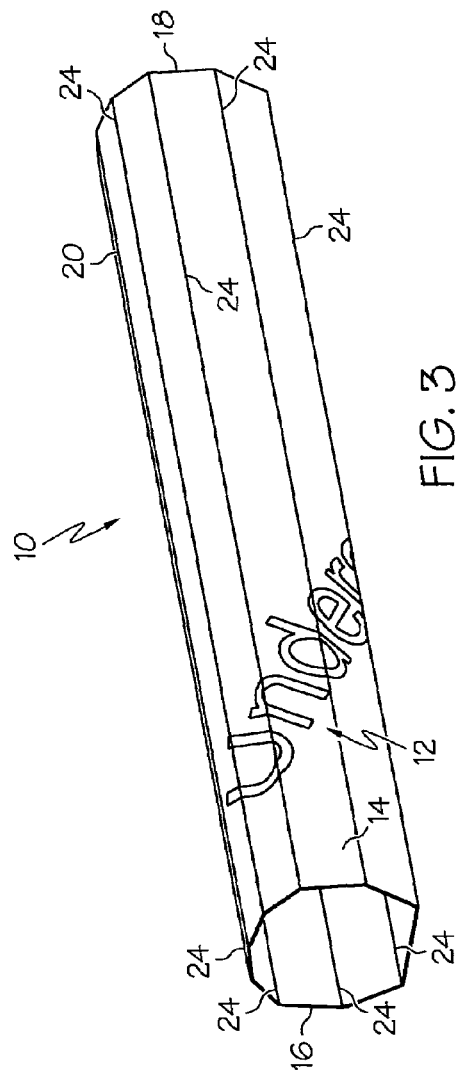

DECORATIVE GRIP AND METHOD FOR MAKING

This application claims priority to U.S. Provisional Application Ser. No. 60/467,834, filed May 5, 2003, and U.S. Provisional Application Ser. No. 60/538,924, filed Jan. 23, 2004. The contents of both of these applications are hereby incorporated by reference.

The present invention is directed to a grip and a method for manufacturing a grip, and more particularly, to a grip having decorative features and a method for manufacturing a grip having decorative features.

BACKGROUND

Golf grips are typically made of wrapped leather, molded natural leather or molded solid colored synthetic materials. Such materials limit the ability to incorporate graphics and color into the grips due to the relatively dark color of the materials, as well as the difficulties of printing on such materials. As an alternative, the outer surface of golf grips may be etched or molded to form a recess and the recessed area may be filled with paint or other colorants to provide basic designs and patterns. However, this method for forming decorative patterns is difficult to implement, expensive to manufacture, and lacks durability.

Another method for creating a golf club with graphics displayed in the grip area involves attaching a printed label directly to the club shaft and sliding a clear (i.e. "water-clear"—which has a lower light tranmisivity than, for example "ultra-clear") thermoplastic grip shell over the attached label such that the attached label is visible through the clear thermoplastic grip. However, this type of decorative grip is cumbersome and difficult to assemble. In particular, in order to assemble such a grip, the golf club shaft must first be cleaned to a like-new condition such that the shaft is free of all tape and residue from any previous grips. A label-type sticker bearing the decorative features is then wrapped over the clean shaft, and great care must be taken at this time to align the sticker so that the sticker is properly centered in relation to the central vertical axis of the shaft. Care must also be taken not to wrinkle the sticker during such application.

The sticker is then sprayed with a sealant such as hairspray or the like, and the sealant is also sprayed onto the inside of a clear thermoplastic grip shell. The clear grip shell is then slid over the label, while taking care not to move or wrinkle the label underneath. The walls of the grip shell must be relatively thick to ensure that the grip shell does not rupture during the assembly process and to provide the necessary thickness to the finished grip.

This multi-step process for assembling a decorative grip is labor intensive and inefficient. Furthermore, a drawback to a golf grip assembled in this manner is that the grip shell is relatively thick which limits the visibility of the decorative label, distorts the graphics, and thereby reduces aesthetic appeal. Specifically, the thickness of the water-clear thermoplastic grip creates a hazing effect, thereby reducing aesthetic appeal. Additionally, the thickness of the grip wall can produce an angle of refraction thereby distorting the visible features of the decorative label.

Accordingly, there is a need for a grip for a component, such as a golf club, which has decorative features yet which is durable and robust. There is also a need for a method for forming such a grip.

SUMMARY

The present invention is a decorative grip which is durable and robust. In particular, in one embodiment, the invention is a decorative grip system including a decorative grip having a label with decorative indicia located thereon, the label being formed in a generally closed shape. The decorative grip system further includes an underlay layer located generally inside of the label and a generally translucent overlay layer located generally outside of the label and having a thickness of less than about 5/32 inch.

In another embodiment the invention is a decorative grip system including a decorative grip having a label with decorative indicia located thereon, the label being formed in a generally closed shape. The decorative grip system further includes an underlay layer located generally inside of the label and a generally translucent overlay layer located generally outside of the label. The decorative grip is formed in a generally tubular shape and includes a central opening for receiving a component to be gripped therein. The decorative grip includes a pair of ends, one of the ends being an open end to provide access to the central opening, the other one of the ends being generally closed.

In another embodiment the invention is a decorative grip system including a decorative grip having a label with decorative indicia located thereon, the label being formed in a generally closed shape. The decorative grip system further includes an underlay layer located generally inside of and fused to the label, and a generally translucent overlay layer located generally outside of the label.

In another embodiment the invention is a method for manufacturing a decorative grip system including the steps of providing a label having decorative indicia located thereon and forming the label into a generally closed shape. The method further includes the steps of forming an underlay layer inside the label and forming a generally translucent overlay layer outside of the label.

These and other objects and advantages of the present invention will be apparent from the following description, the accompanying drawings and the appended claims.

BRIEF DESCRIPTION OF THE DRAWINGS

FIG. 2 is a front perspective view of the label of FIG. 1, with the label being partially folded;

FIG. 3 is a front perspective view of the label of FIG. 2, with the label being fully folded;

DETAILED DESCRIPTION

FIGS. 1-11 illustrate one set of steps which may be utilized to manufacture the decorative grip or handle of the present invention. FIGS. 1-11 show the steps for manufacturing a single grip, although it should be understood that a number of grips may be simultaneously manufactured in bulk manner. It should also be understood that the grip of the present invention can be manufactured by a wide variety of methods, and the method shown herein is merely one illustrative example. Furthermore, various ones of the steps disclosed herein may be reversed or carried out in the various orders besides the specific order disclosed herein.

Figure 1:
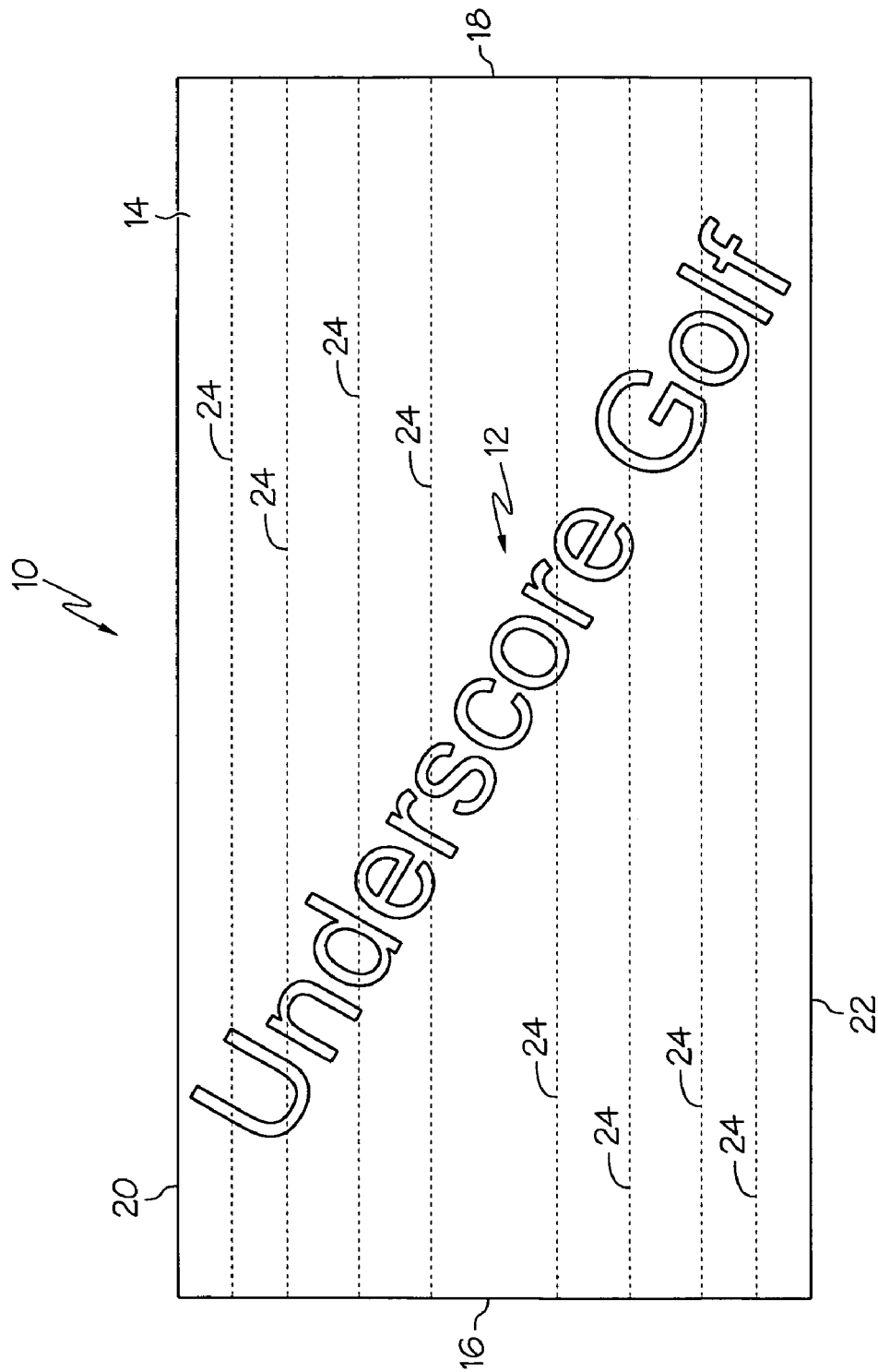
FIG. 1 is a top plan view of a label.

As shown in FIG. 1, the process may begin by first printing or creating a decorative label 10 by printing a decorative design 12 on a substrate 14 to form the decorative label 10. The decorative design 12 may include any of a wide variety of decorative features, including text, patterns, pictures, photographs, logos, slogans, designs, drawings, artwork, colors, sketches, etc. The decorative design 12 can be created by a wide variety of manners, includes graphic design computer programs, freehand drawing, computer generated images, digital or analog photographs, prints or the like. In the illustrated example, the decorative design 12 is the text "Underscore Golf."

The substrate 14 upon which the decorative design 12 is printed may be any of a wide variety of materials, and may be a microporous silica-based printing sheet, or a microporous, highly filled polyethylene matrix printing sheet (for example, a sheet of TESLIN® material manufactured by PPG Industries, Inc. of Pittsburgh, Pa.), and may have a thickness of between about 1 and about 100 mils, preferably about 10 mils. The substrate 14 may be microporous so that the substrate 14 can readily absorb ink, dyes, etc. printed thereon. The substrate 14 may also have a relatively low coefficient of friction so that injection molded material can flow smoothly across the surface of the decorative label 10. The decorative design 12 may be deposited or printed on the substrate 14 by any of a wide variety of printing methods, such as digital printing, flexographic printing, lithography, graveure printing, etc.

The decorative label 10 is then coated with a protective coating (not shown) on the printed surface of the substrate 14/decorative label 10 to stabilize the ink on the substrate 14 to improve durability for subsequent handling. The protective coating may be a UV protective or UV resistant material to provide extensive UV resistance to the substrate 14. The protective coating may include UV energy cross-linkable coatings that reduce the tendency of the substrate 14 to stretch during injection molding. For example, the coating may be a lacquer-type coating, or a clear, transparent or translucent variant of an ink optimized for microporous sheets, such as GRA-C501 and the GRA series of coatings available from Pinnacle Products Group, Ltd. of Dayton Ohio.

If not already cut to the desired shape, the decorative label 10 is then cut into the desired shape by any desired manner, such as die cutting. The decorative label 10 may take any of a wide variety of shapes and sizes. However, in the illustrated embodiment, the decorative label 10 is generally rectangular having a pair of opposed end edges 16, 18 and a pair of opposed longitudinal edges 20, 22, and may have dimensions of about 10 inches by about 3 inches or various other dimensions as desired. If desired, the decorative label 10 may be formed with fold lines 24, or fold lines 24 may be created on the decorative label 10 after printing. The decorative label 10 may include more or less fold lines than those shown in FIG. 1.

Next the decorative label 10 is folded outwardly about the fold lines 24 to form the decorative label 10 into a generally closed shape (i.e., a generally cylindrical or tube shape), as shown in FIG. 2. It should be noted that the term "tubular" as used herein means a generally closed shape and does not denote any particular shape in cross section. Thus a tubular shape may include components that are generally circular, square, triangular, hexagonal, irregular, etc. in cross section.

If desired, the decorative label 10 may be folded about a mandrel to aid in the folding process at this step. The decorative label 10 may be folded such that the decorative design 12/protective coating is on the outer surface of the folded decorative label 10. The folded decorative label 10 may be folded or shaped to generally match the shape of the component to which the grip will be mounted, such as, for example, the shaft of a golf club.

Once the decorative label 10 is folded, the outer longitudinal edges 20, 22 of the decorative label 10 may overlap slightly (by, for example, about 1-2 mm) and may be adhered together by any of a variety of methods. For example, a narrow line of acid free, photo-safe permanent adhesive may be applied at various spaced points 26 (i.e., about four to about seven points as shown in FIG. 3) along the length of the overlapping edges 20, 22 to secure the overlapping edges 20, 22 together, to thereby provide the decorative label 10 as shown in FIG. 3. The steps of folding the decorative labels 10 and adhering the overlapping edges 20, 22 may be carried out either manually or by an automated process, or by some combination thereof.

Figure 4:
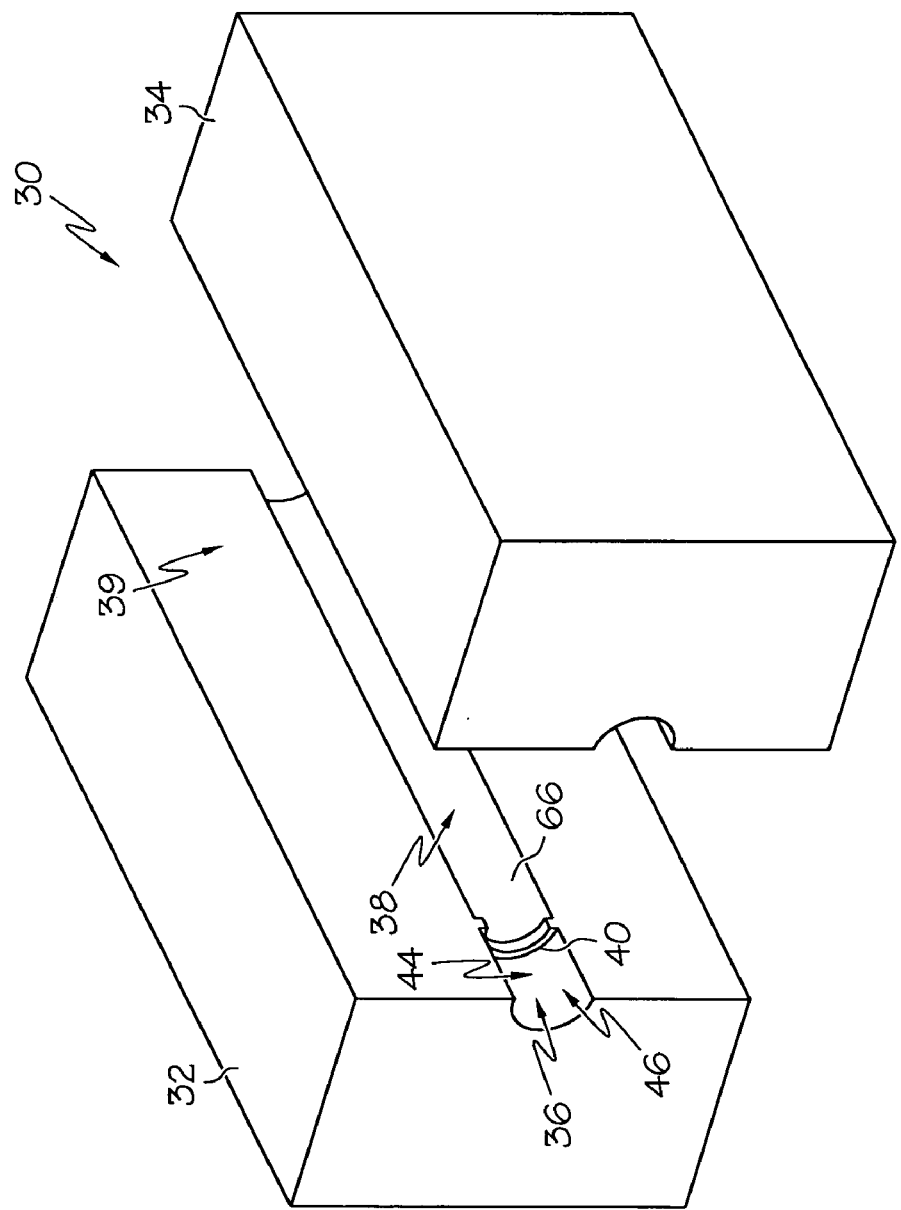
FIG. 4 is a front perspective view of a mold, with the two mold halves separated.
Figure 5:
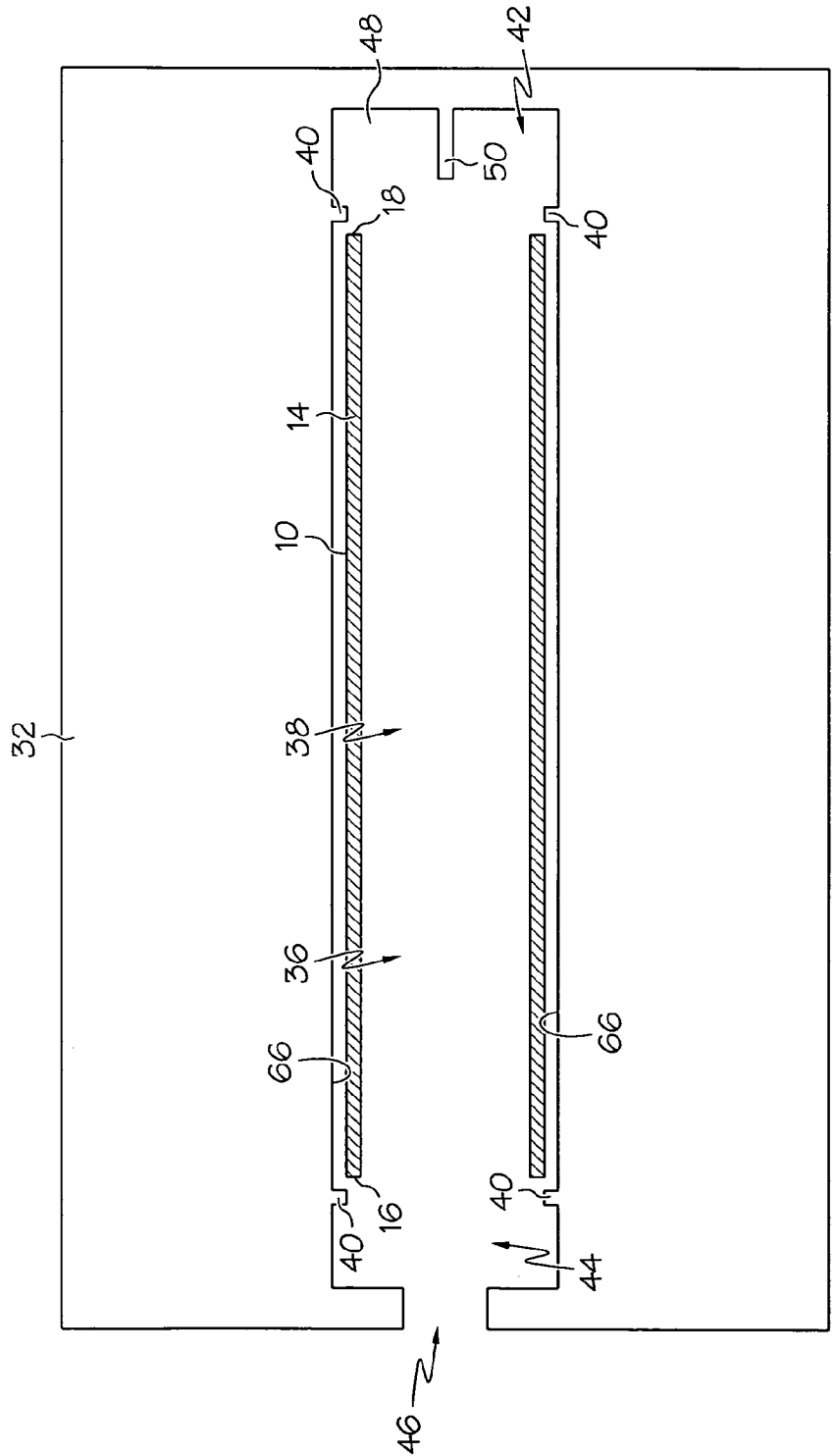
FIG. 5 is a side view of the mold of FIG. 4, with the label of FIG. 3 inserted therein and shown in cross section.

The folded printed decorative label 10 is then placed into a cavity injection mold 30, such as that shown in FIG. 4. The illustrated mold 30 includes two mold halves 32, 34 which, when brought together, join seamlessly to form a mold inner cavity 36. As shown in FIGS. 4 and 5, the mold cavity 36 includes a label-receiving portion 38 which is sized and located to generally closely receive the folded label 10 therein. The label-receiving portion 38 is defined by and located between a pair of radially inwardly-extending flanges 40 that extend circumferentially about the mold cavity 36. The mold cavity 36 further includes an end cap portion 42 (located axially outside one of the flanges 40) and a grip collar portion 44 located axially outside the other flange 40. The mold cavity 36 may include an open end 46 located adjacent to the grip collar portion 44 and a closed end 48 located adjacent to the end cap portion 42. The closed end 48 may have an end protrusion 50 extending into the mold cavity. The end protrusion 50 may include a relief opening (not shown) formed therein to provide pressure relief during the molding process 36.

The mold cavity 36 and label 10 are shown as having a straight (i.e., non-tapered) shape. However, it should be understood that the mold cavity 36 and label 10 may have a variety of shapes, includes angled (i.e. tapered) cylinders, tubes, etc.

With reference to FIG. 5, when the label 10 is inserted into the mold cavity 36, the label 10 is generally closely received in the label-receiving portion 38 and held between the flanges 40 (FIG. 5 illustrates the label 10 somewhat spaced away from the walls 66 of the mold cavity 36 and from the flanges 40 for illustrative purposes; in actuality the label 10 may be quite closely received in the mold cavity 36). The label 10 should be inserted into the mold cavity 36 such that the overlapping edges 20, 22 are not aligned with the split 39 in the mold 30 (i.e., where the two mold halves 32, 34 join), and the label 10 may have a registration mark printed thereon to ensure the label 10 is properly aligned in the mold cavity 36.

Figure 6:
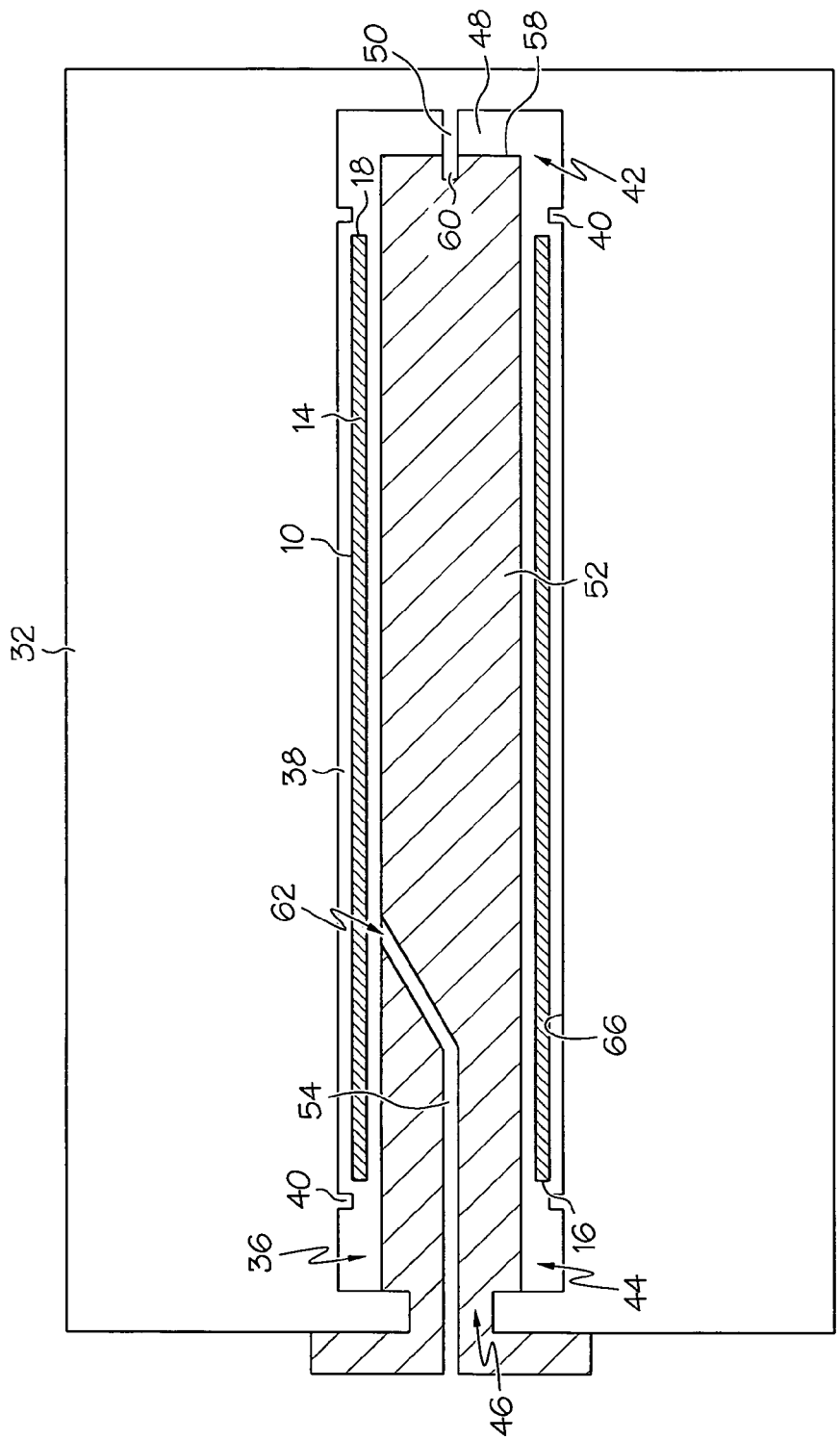
FIG. 6 is a side view of the label and mold of FIG. 5, with a core pin inserted therein.

Once the label 10 is properly located inside the mold cavity 36, a core pin 52 is inserted into the mold cavity 36 and received through the label 10 (FIG. 6). The core pin 52 is generally solid and includes a central artery or central opening 54, and includes relatively small end relief opening 60 at its distal end 58 that is aligned with and receives the end protrusion 50 therein.

The core pin 52 also includes an injection opening or gate 62 communicating with the central opening 54. The gate 62 may form an angle with the central axis of the core pin 52. The angle may have a wide variety of ranges, such as between about 0 degrees and about 65 degrees, preferably about 5 degrees. As will be discussed in greater detail below, the angled nature of the gate 62 directs injected material towards the closed end 48 of the mold cavity 36. The gate 62 may be located at or generally adjacent to the open end 46 of the mold cavity 36. In particular, the gate 62 may be located within about 1 inch, or within about 3 inches of the open end 46 of the mold cavity 36. Thus the gate 62 may be adjacent to the open end 46 such that the gate 62 is located within a distance of about 5% or about 30% of the length of the mold cavity 36 from the open end 46 of the mold cavity 36. The gate 62 may also be located within a distance of about 5%, or about 30%, of the length of the core pin 52 from the open end 46.

After the core pin 52 is inserted into the mold cavity 36 and through the label 10, the core pin 52 is then locked into position (i.e., by securing the core pin 52 to one of the mold halves 32, 34). The mold halves 32, 34 are then brought together to close the mold, and the mold 30 is locked shut. When the mold 30 is locked shut, it is desired that the outer surface of the label 10 rest against the cavity wall 66. The shape, size and curve of the label 10 should match that of the cavity wall 66 to ensure that the label 10 is kept stable during the injection molding process. Further, because the outer surface of the core pin 52 defines the inner diameter of the finished grip, the outer diameter and shape of the core pin 52 should be carefully selected to provide the desired shape to the inner diameter of the finished grip.

The material which is desired to form the inner portion of the molded grip (i.e., the underlay material 70) is then injection molded into the mold cavity 36 via the core pin 52. The injected material 70 may be any of a wide variety of materials which have sufficient flexibility and can be injection molded, including, but not limited to, thermoplastic materials, vulcanizable rubbers, or thermoplastic elastomers such as DYNAFLEX® thermoplastic rubber or elastomer sold by GLS Corporation of McHenry, Ill. or ®SANTO-PRENE® thermoplastic elastomer made by Advanced Elastomer Systems of Akron, Ohio. The injection molded material 70 forms an underlay layer that, when cured, may have a hardness of between about 20 Shore A and about 60 Shore A or 55 Shore A.

The injection-molded material 70 may be injected at temperatures of about 190° F. and about 400° F. and at pressures between about 50 psi and about 500 psi. The injection molded material 70 may be a non-metallic material and may have nearly any desired thickness, such as, for example, greater than or less than about 1/64" greater than or less than about 1/32", greater than or less than about 1/16", greater than or less than about 1/8", greater or less than about 5/32", greater than or less than about 1/4" or greater than or less than about 1/2".

Figure 7:
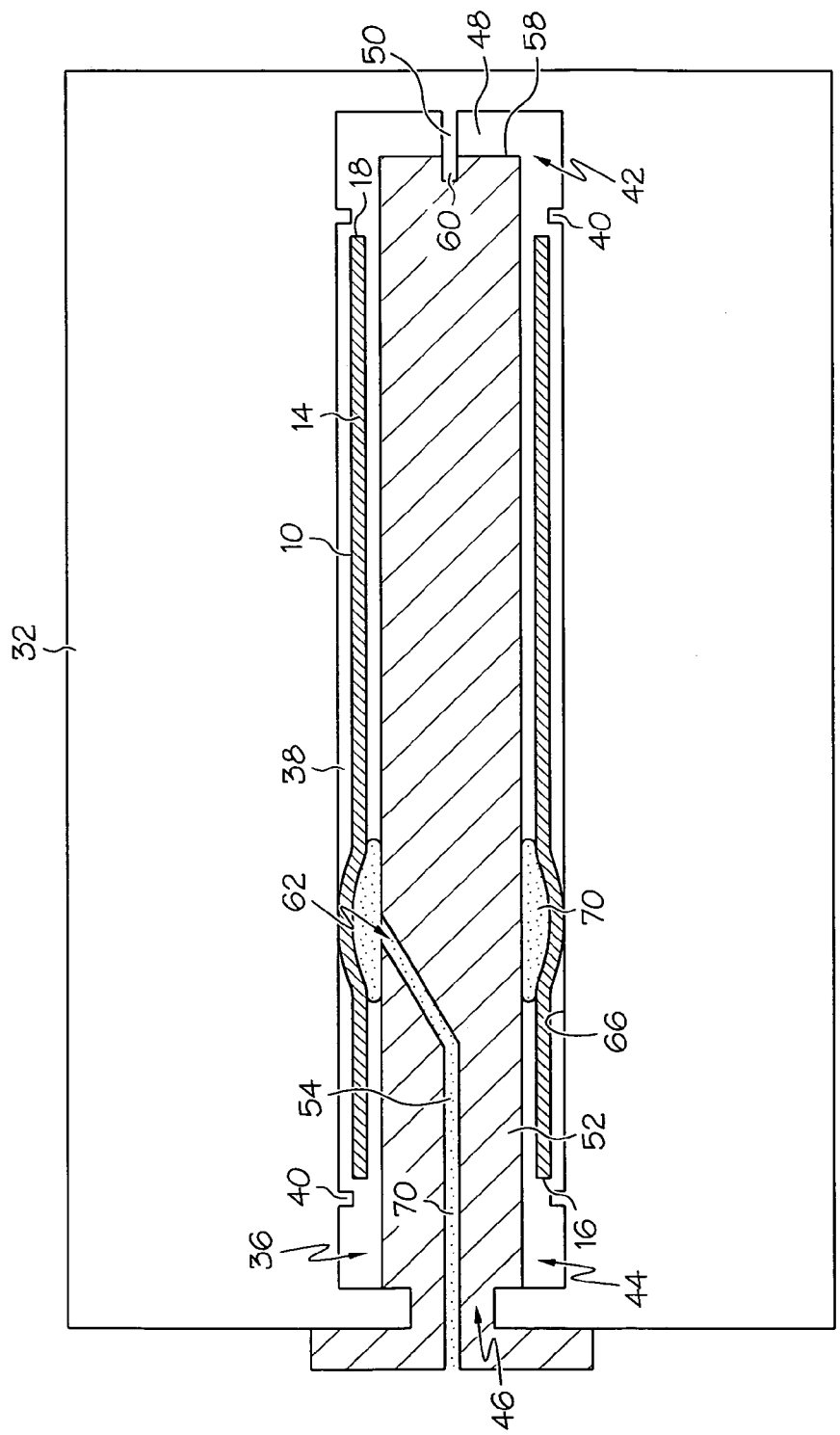
FIG. 7 is a side view of the label, mold and core pin of FIG. 6, with the core pin injecting material into the mold.

The injection-molded material 70 is introduced under pressure into the core pin 52 and fills the central opening 54 and exits through the gate 62. As the injected material 70 is injected into the mold cavity 36 via the gate 62, the injected material 70 impinges against the inner surface of the label 10 and presses the label 10 against the wall 66 of the cavity 36 (FIG. 7). The injected material 70 progressively moves along the length of the mold cavity 36, forcing the label 10 against the inner wall 66 of the mold cavity 36 as the injected material 70 moves toward the closed end 48. As noted above, although the label 10 may already lie flush against the inner wall 66 of the mold cavity 36, FIGS. 5-7 illustrate the label 10 slightly spaced away from the inner wall 66 of the mold cavity 36 such that the label 10 is forced against the inner wall 66 of the mold cavity 36 by the injected material 70 during the injection process.

Because the gate 62 is located near the open end 46 of the mold cavity 36 and is angled to inject material toward the closed end 48, the gate 62 forces the injected material 70 away from the open end 46 until the closed end 48 is filled. Once the closed end 48 and the end cap 42 portion of the mold cavity 36 are filled with injection material 70, the front (or collar portion 44) of the mold cavity 36 is filled with the injected material 70.

This arrangement and location of the gate 62 helps to ensure that introduction of the injected material 70 between the label 10 and wall 66 at the axial ends of the mold cavity 36 is minimized. In particular, if the injected material 70 were to be inserted between the label 10 and the cavity wall 66, the injected material 70 would block the visibility of part of the label 10 and the appearance of the grip would be degraded. Because the injected material 70 is injected at a location relatively remote from the edge 18, by the time the injected material 70 reaches the edge 18 the majority of the length of the label 10 has been pressed against the wall 66 of the mold cavity. Accordingly, when the injected material 70 reaches the edge 18, it is difficult to peel the edge 18 away from the cavity wall 66 such that the introduction of the injected material 70 between the label 10 and the wall 66 is minimized. Similarly, by the time the injected material 70 reaches the edge 16, nearly the entire label 10 is pressed against the wall 66, thereby reducing the chance for the injected material to be forced between edge 16 and cavity wall 66. Thus by the time the injected material reaches the label edges 16, 18, the risk of the injected material 70 overtaking the label edges will have been greatly diminished.

The end flanges 40 trap the label 10 therebetween during the molding process, and thereby contribute to the stability of the molding process. Thus, the end flanges 40, the precision sizing and placement of the label 10 within the mold cavity 36, the position and angle of the gate 62 and the rate of flow of material 70 through the gate 62 helps to securely retain the label 10 in position, and eliminates the need to hold the label 10 in place through other means, such as electrostatic energy. As the hot injected material 70 presses against the label 10, the injected material chemically reacts with the interior surface of the label (i.e. the substrate 14), thereby permanently fusing the label 10 and injected material 70 (as described in, for example, U.S. Pat. No. 6,544,634, the contents of which are hereby incorporated by reference).

Figure 8:
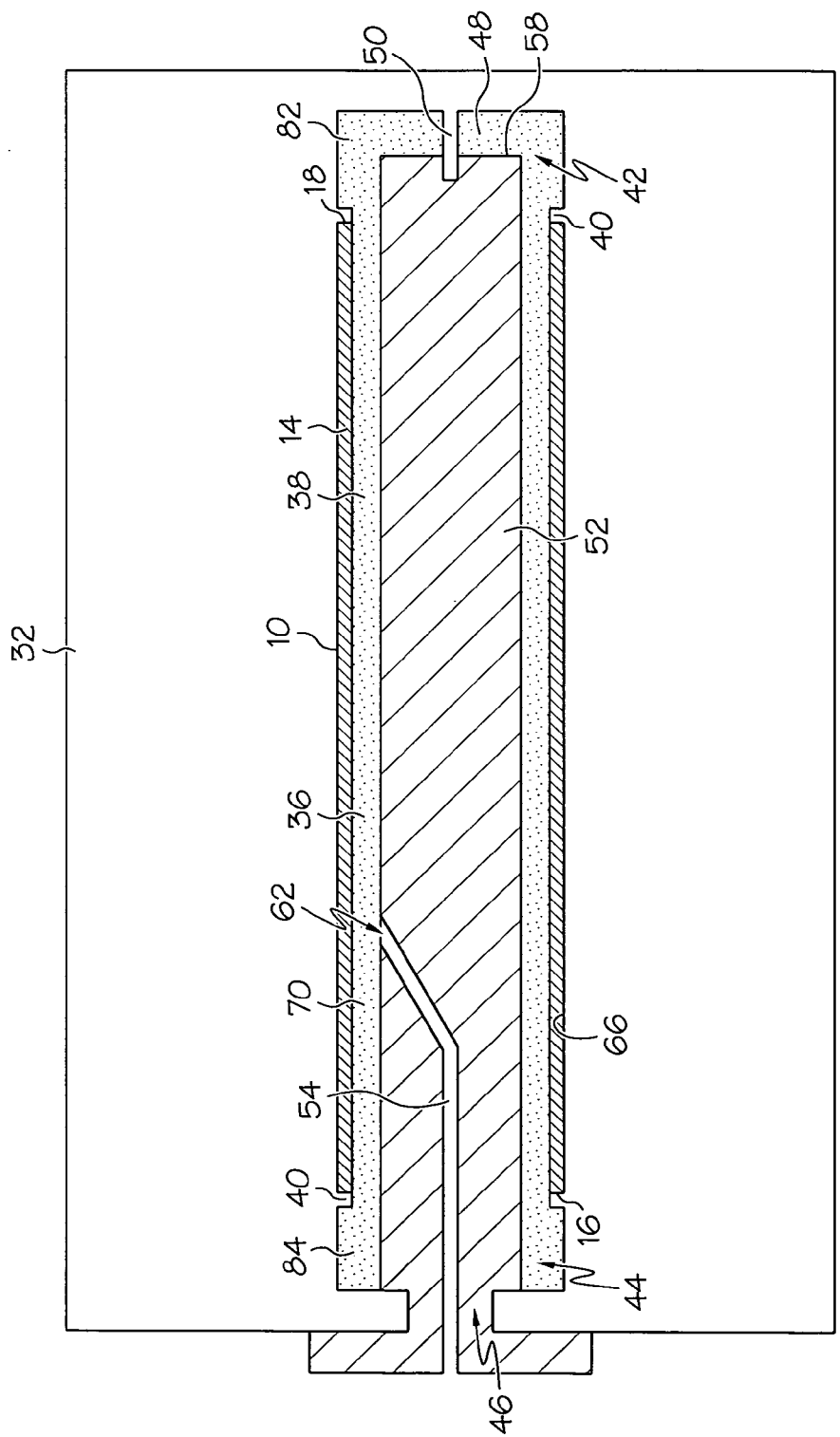
FIG. 8 is a side view of the label, mold and core pin of FIG. 7, with the mold generally filled with injected material.
Figure 9:
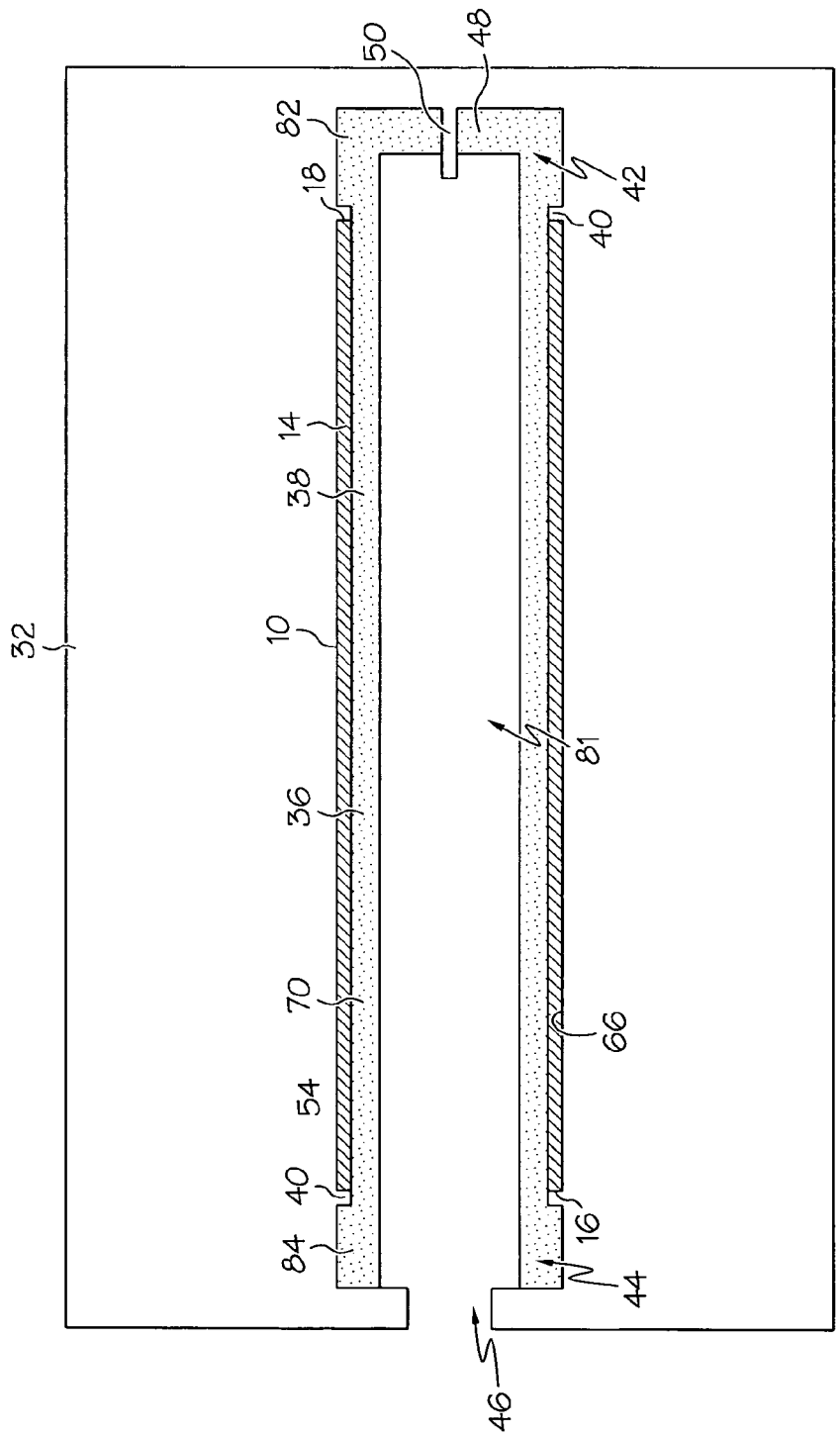
FIG. 9 is a side view of the label and mold of FIG. 8, with the core pin being retracted.

In those areas of the cavity 36 where the label 10 is not located (i.e., the end cap portion 42 and the collar portion 44), the injected material 70 fills those recesses of the mold cavity 36 to form the end cap 82 and grip collar 84 of the grip 80 (FIG. 8). The timing of the molding cycle is continuously monitored and adjusted to account for changes in the interior and exterior mold temperatures. Thus, a mold cycle can last for any of a wide variety of times, such as between about 5 and about 90 seconds. Once the mold cavity 36 is completely filled with injectable material 70, the flow of material 70 through the core pin 52 and gate 62 is terminated, and the mold halves 32, 34 are opened. The core pin 52 is then retracted from the mold cavity 36 (FIG. 9) and the formed grip 80 is removed from the mold 30, thereby resulting in the grip 80 shown in FIG. 10 having a central opening 81.

The molded grip 80 may then be treated with an overlay material 90 to protect the printed label 10 from ambient conditions and friction of use, and also to provide an improved tactile material for gripping. The overlay 90 may be made of any of a wide variety of materials which provide the desired tactile feel and are generally transparent, translucent, or see-through, such as, for example, a clear, translucent or transparent elastomer or thermoplastic material having a hardness of between 30 Shore A and 55 or 60 Shore A, or less than about 60 Shore A, or less than about 55 Shore A, or less than about 30 Shore A. The overlay material 90 may have a sufficient light transparency so as to be classified as "ultra-clear." The overlay material 90 may have a thickness of greater than or less than about ¼", or greater than or less than about ⁵⁄₃₂", or greater than or less than about ⅛", or greater than or less than about ¹⁄₁₆", or greater than or less than about ¹⁄₃₂". The overlay material 90 may bond or be bonded to the label 10.

The overlay material 90 may be made of a wide variety of materials, including but not limited to silicone rubber, synthetic polyisoprene, polyurethane, a clear, translucent or transparent thermoplastic elastomer alloy such as VERSAFLEX® thermoplastic rubber sold by GLS Corporation of McHenry, Ill., a clear, translucent or transparent thermoplastic elastomer, KRATON® thermoplastic rubber sold by Shell Oil Company of Houston, Tex., or OPTIFLEX™ material sold by Star Thermoplastic Alloy & Rubbers, Inc. of Chicago, Ill. The overlay material 90 may be silicon, such as a medical grade silicon, deposited on the grip 80 by an extrusion method, or other generally transparent or translucent materials with the desired tactile properties. The overlay material 90 may have a soft or tacky feel to aid a user of the grip, and may have UVA/UVB protective qualities to further protect the decorative design 12 of the label 10 from sun or light damage, in addition to acting as a protectant to minimize the effects of solvents and perspiration on the label 10.

Figure 11:
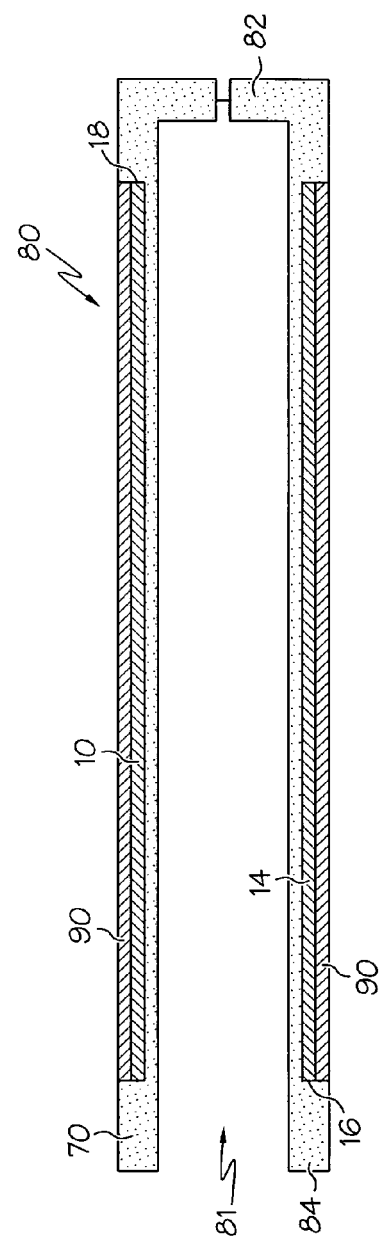
FIG. 11 is a side cross section view of a grip coated with an overlay coating.

The overlay 90 may be located on the grip 80 by a wide variety of methods, including but not limited to depositing the overlay 90 in an overmolding process. In particular, a second mold may be provided such that the freshly molded grip 80, while still located on the core pin 52 from the original molding process, can be inserted into a second (overmolding) mold machine. The overlay material 90 may then be shot into the mold cavity and directly onto the decorated surface of the grip 80. In this case only the decorated portions of the grip 80 (i.e. the portions of the grip 80 located radially adjacent to the decorative label 10) may be coated with the overmold. Alternately, the entire outer surface of the grip 80 (including the surfaces of the end cap 82 and the grip collar 84) may be coated with the overlay material 90. Further alternately, the overlay material 90 may first be molded to the decorative (outer) surface of the label 10 prior to the molding of the underlay layer 70 to the inner surface of the label 10. The overlay material 90 may be located on the entire outer surface of the grip 80, or may be located only between the end cap 82 and grip collar 84, as shown in FIG. 11.

Figure 10:
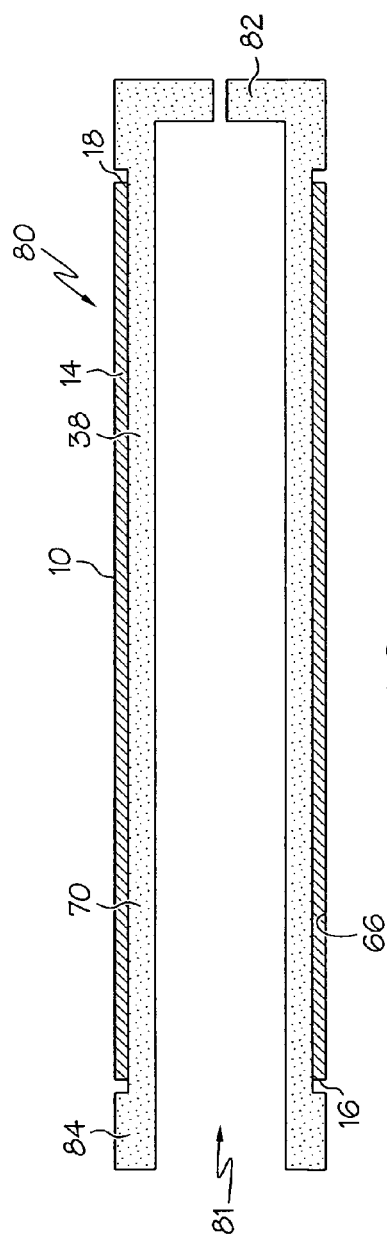
FIG. 10 is a side cross-section view of a grip removed from the mold of FIG. 9.

Rather than overmolding the overlay material 90, the overlay material 90 may be deposited simply by dipping the grip 80 in a liquid vat of overlay material 90 or spraying the grip with the overlay material 90 or the like. The overlay 90 is then allowed to cure (for example, at room temperature). If desired, the end cap 82 and grip collar 84 of the grips 80 may be masked off while depositing the overlay material 90 to ensure that the overlay material 90 covers only the decorative surface of the grip 80. Because the decorative surface (i.e., adjacent to the label 10) may be radially recessed with respect to the end cap 82 and grip collar 84, the deposited overlay material 90 may have a thickness equal to that of the recess such that the overlay material 90 is generally flush with the end cap 82 and grip collar 84 (as shown in FIG. 10). As can be seen the end cap 82 and grip collar 84 extend beyond the label 10, which has a length extending in the axial direction. Although the end cap 82 and grip collar 84 may have any of a variety of lengths, in one embodiment the injected material or underlay layer 70 has a length extending in said axial direction that is less than about 150%, or less than about 120% of the length of said label 10.

Figure 12:
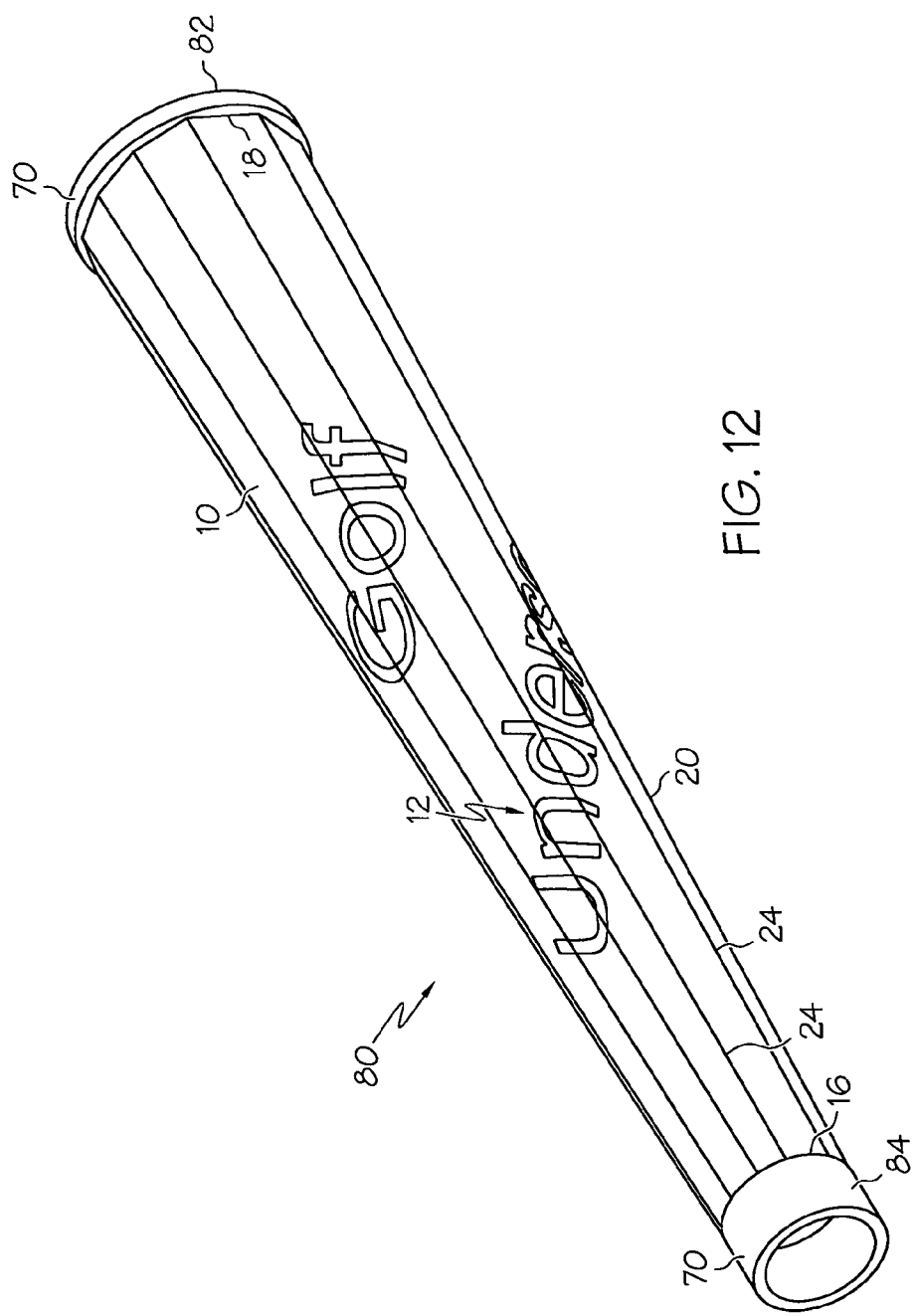
FIG. 12 is a front perspective view of the grip of FIG. 11.
Figure 13:
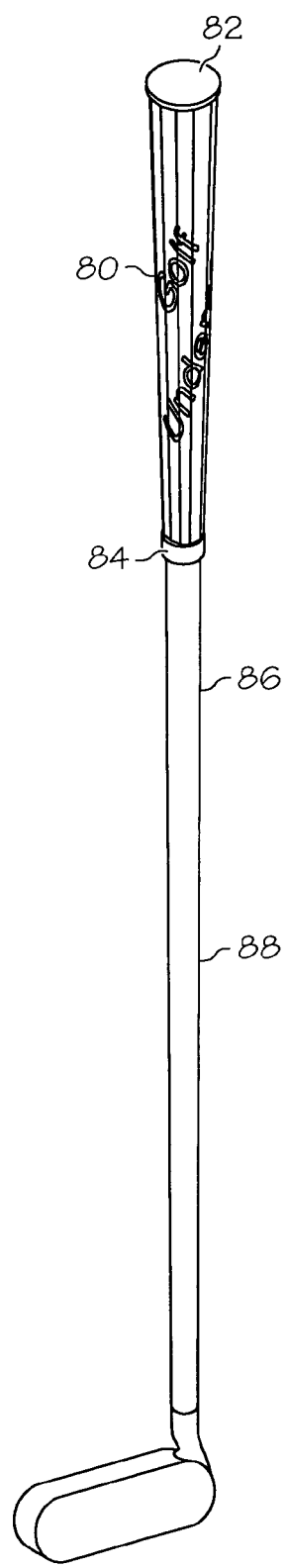
FIG. 13 is a front perspective view of a golf club with the grip of FIG. 12 mounted thereon.

Once the grips 80 are molded and the overlay material 90 is formed thereon, the grips 80 may be shipped to a customer/end user. In addition, or alternately, the grips 80 may then be slipped over the gripping surface of a component, such as a golf club (including putters, irons and woods). In the case of golf clubs, because the grip 80 of the present invention may be shaped to fit over a standard golf club shaft 86, the grip may be mounted or applied using standard instrumentation and method of traditional golf grip application (i.e. simply lubricating the golf or club shaft and/or placing a lubricating two-ply tape around the golf club shaft and sliding the grip over the end of the shaft). FIG. 12 illustrates a finished grip 80. The end cap 82 of the grip 80 shown in FIG. 12 is somewhat shorter than the end cap 82 shown in FIGS. 8-11. FIG. 13 illustrates the grip 80 mounted onto the shaft 86 of a golf club 88. The inner diameter of the grips may be equal to or slightly smaller than the diameter of the shaft to which the grip is mounted to ensure a tight fit.

Thus, the method of the present invention provides grips having high quality printed graphic designs with durable performance-enhancing tactile gripping surface in a one-piece standard installation golf grip. In particular, the grips can display high-resolution photographic images, graphic designs, logos, colors, and/or text. Furthermore, the grips may be covered by a thin, transparent or translucent overlay material that allows the images, designs, colors or text to be visible through the overlay material with minimal thickness and therefore minimal distortion. The overlay material protects the images, designs, color and text from the abrasive effects of gripping and aging due to exposure to the elements, and also serves as a primary gripping surface.

Besides golf grips, the method of the present invention, and the grips themselves, may be utilized in a wide variety of devices and industries, including but not limited to, bicycles, tool handles, kitchen utensils, appliances, motor vehicles, racket sports, etc.

Having described the invention in detail and by reference to the preferred embodiments, it will be apparent that modifications and variations thereof are possible without departing from the scope of the invention.

What is claimed is:

1. A decorative grip system including a decorative grip comprising:
   a label having decorative indicia located thereon, said label being formed in a generally closed shape;
   an underlay layer located generally inside of said label, wherein said label is fused to said underlay layer; and
   a generally translucent overlay layer located generally outside of said label and having a thickness of less than about 5/32 inch, wherein said overlay layer is overmolded to bond said overlay layer to said label, and wherein said decorative grip is formed in a generally tubular shape and includes a central opening for receiving a component to be gripped therein, wherein said decorative grip includes a pair of ends, one of said ends being an open end to provide access to said central opening, the other one of said ends being generally closed.

2. The decorative grip system of claim 1 wherein said overlay layer has a hardness of less than about 55 Shore A.

3. The decorative grip system of claim 1 wherein said label is a microporous silica-based sheet or a microporous polyethylene matrix sheet.

4. The decorative grip system of claim 1 wherein said overlay layer is a generally translucent elastomer or thermoplastic material.

5. The decorative grip system of claim 1 wherein said underlay layer is a thermoplastic material, or a vulcanizable rubber, or a thermoplastic elastomer.

6. The decorative grip system of claim 5 wherein said underlay layer has a thickness of greater than about 1/16 inch.

7. The decorative grip system of claim 1 further comprising a component having a body and a grip portion shaped to be gripped, and wherein said decorative grip is located on said grip portion.

8. The decorative grip system of claim 7 wherein said component is a golf club having a club shaft and a club head, and wherein said decorative grip is located on said club shaft.

9. The decorative grip system of claim 1 wherein said underlay layer and said overlay layer are generally co-extensive with said label.

10. The decorative grip system of claim 1 wherein said label is formed into a closed tubular shape having a central axis, and wherein said label has an overlap in the radial direction extending generally the entire length of said label along said axis to aid in maintaining said underlaying layer generally inside of said label during formation of said decorative grip.

11. A decorative grip system including a decorative grip comprising:
    a label having decorative indicia located thereon, said label being in a closed tubular shape having a central axis, and wherein said label has an overlap in the radial direction extending generally the entire length of said label along said axis;
    an underlay layer located generally inside of said label, wherein said label is fused to said underlay layer; and
    a generally translucent overlay layer located generally outside of said label and having a thickness of less than about 5/32 inch, wherein said overlay layer is overmolded to bond said overlay layer to said label, and wherein said decorative grip is formed in a generally tubular shape and includes a central opening for receiving a component to be gripped therein.

12. The decorative grip system of claim 11 wherein said label has said overlap in the radial direction to aid in maintaining said underlaying layer generally inside of said label during formation of said decorative grip.

* * * * *